United States Patent [19]

Varadaraj

[11] Patent Number: 5,698,441
[45] Date of Patent: Dec. 16, 1997

[54] SURFACTANT FORMULATIONS CONTAINING MENTHADIENE AND MENTHADIENE ALCOHOL MIXTURES FOR ENHANCED SOIL BIOREMEDIATION

[75] Inventor: Ramesh Varadaraj, Flemington, N.J.

[73] Assignee: Exxon Research & Engineering Company, Florham Park, N.J.

[21] Appl. No.: 530,555

[22] Filed: Sep. 19, 1995

[51] Int. Cl.[6] .............................. B09B 3/00; C12N 1/38; B01F 17/00; C02F 3/00
[52] U.S. Cl. .................. 435/262.5; 252/351; 252/312; 210/610; 210/925; 435/244
[58] Field of Search .................. 252/351, 312; 435/262.5, 244; 210/610, 925

[56] References Cited

U.S. PATENT DOCUMENTS

| | | | |
|---|---|---|---|
| 4,414,128 | 11/1983 | Goffinet | 510/405 |
| 4,830,759 | 5/1989 | Charlier | 252/312 |
| 5,156,766 | 10/1992 | Behan et al. | 252/312 |
| 5,171,475 | 12/1992 | Freiesleben | 252/312 |
| 5,336,428 | 8/1994 | Kaplan et al. | 510/188 |
| 5,348,803 | 9/1994 | Schlaemus et al. | 210/610 |
| 5,436,160 | 7/1995 | Varadaraj et al. | 435/262.5 |
| 5,549,839 | 8/1996 | Chandler | 210/925 |
| 5,605,651 | 2/1997 | Balzer | 252/312 |

OTHER PUBLICATIONS

Hawley's Condensed Chemical Dictionary, Eleventh Edition, (Van Nostrand Reinhold Co., NY, NY) pp. 1127–1128, 1987 month unavailable.

Kirk–Othmer Encyclopedia of Chemical Technology, Third Edition, vol. 22(John Wiley & Sons, NY, NY), pp. 709–712, 722, 730–732, 738 & 742–749, 1983 month unavailable.

Primary Examiner—Richard D. Lovering
Assistant Examiner—Daniel S. Metzmaier
Attorney, Agent, or Firm—Joseph J. Dvorak; Jay Simon

[57] ABSTRACT

The present invention provides an improved surfactant formulation for enhancing the extent of a bioremediation of hydrocarbon contaminated soil, especially hydrocarbon contaminated soil that has been subjected to nutrient assisted bioremediation previously. The formulation includes a mixture of methadienes and methadiene alcohols, certain surfactants and a hydrocarbon solvent.

7 Claims, 1 Drawing Sheet

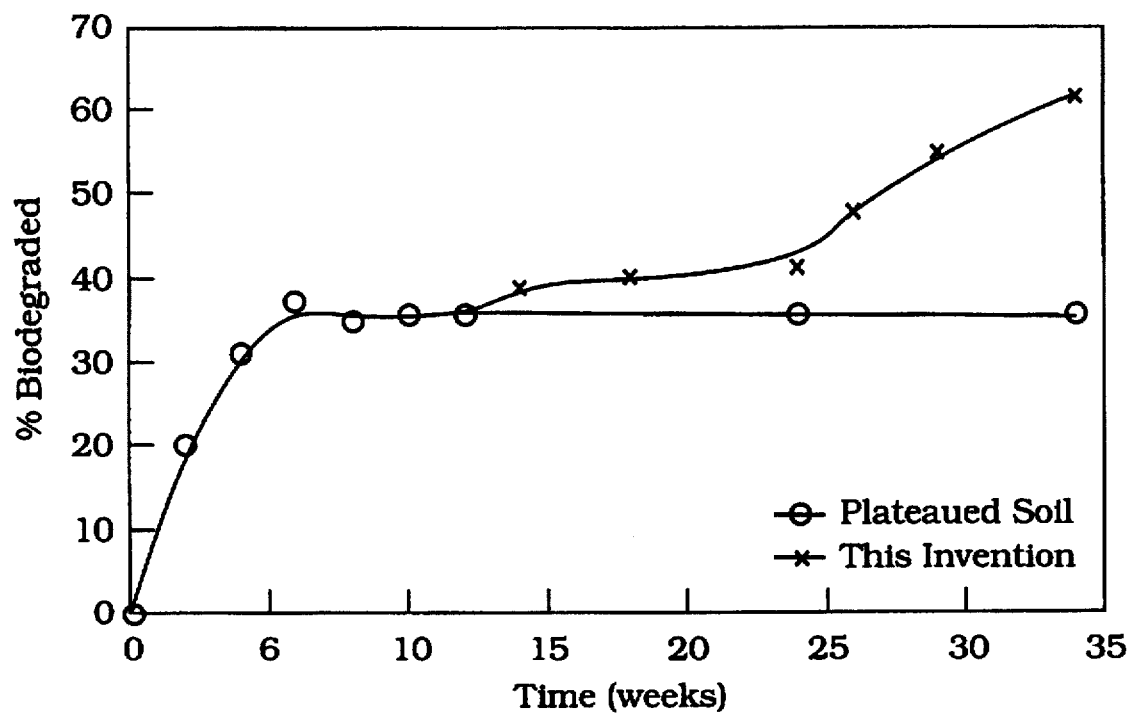

SURFACTANT FORMULATIONS CONTAINING MENTHADIENE AND MENTHADIENE ALCOHOL MIXTURES FOR ENHANCED SOIL BIOREMEDIATION

FIELD OF THE INVENTION

The present invention relates to microbial remediation of hydrocarbon contaminated soil and especially hydrocarbon contaminated soil that had been previously subjected to nutrient assisted bioremediation.

BACKGROUND OF THE INVENTION

Microorganisms present in soil are known to assimilate hydrocarbons but, unfortunately, at such a slow rate that natural biodegradation of hydrocarbon contaminated soil is not a practical soil remediation method. Attempts to accelerate microbial growth to enhance soil remediation typically involve providing microbial nutrient material, especially nitrogen and phosphorous containing nutrient materials to the contaminated soil. More recently microbial nutrients have been applied to contaminated soil in the form of controlled release nutrients, oleophillic nutrients and surfactants with the ultimate objective of enhancing the biodegradation of hydrocarbon contaminants by naturally occurring microflora. Whatever the method used, one of the most striking observations in the biodegradation process of hydrocarbon contaminated soil is the "plateau effect", i.e. the biodegradation vs. time profile exhibits a steady rise for several weeks and then a plateau region occurs where no appreciable degradation is observed. Current understanding of this phenomenon is believed to be related to one or more of:

(a) portions of the contaminant not being bioavailable;

(b) presence of recalcitrant molecules; and, (c) biodegradation intermediates acting as inhibitors to oil degrading microbes.

Therefore, one object of the present invention is to improve the extent of biodegradation achievable with microorganisms.

SUMMARY OF THE INVENTION

Accordingly, the present invention provides an improved surfactant formulation for enhancing the extent of a bioremediation of hydrocarbon contaminated soil, especially hydrocarbon contaminated soil that has been subjected to nutrient assisted bioremediation previously.

In one embodiment of the present invention, the bioremediation of hydrocarbon contaminated soil that was previously subjected to nutrient assisted bioremediation is enhanced by applying to the soil a hydrocarbon solution containing a mixture of menthadiene and menthadiene alcohol and a surfactant selected from the group consisting of: (a) mixture of a sorbitan ester of a $C_7$ to $C_{22}$ monocarboxylic acid and a polyoxyalkylene adduct of a sorbitan ester of a $C_7$ to $C_{22}$ monocarboxylic acid, the adduct having from 4 to 50 polyoxyalkylene units, (b) an alkyl glycoside wherein the alkyl group has from about 8 to about 18 carbon atoms and the glycoside is a mono or diglycoside, or mixtures thereof, and (c) a mixture of (a) and (b) and thereafter applying microbial nutrients to the soil in amounts sufficient to promote the growth of indigenous microorganisms.

In another embodiment at least the top of the soil is mixed after the solution is applied, for example, by tilling, plowing, disking and the like.

In a preferred embodiment of the present invention, the above solution is applied to the soil at a rate from about 1 to 30 weight percent of solution based on the weight of hydrocarbon contaminant in the soil.

These and other embodiments of the present invention will be described in the description which follows.

DESCRIPTION OF THE DRAWING

The accompanying FIGURE compares the extent of biodegradation of a "plateaued" hydrocarbon contaminated soil treated in accordance with the invention compared with one which "plateaued" and was not further treated.

DETAILED DESCRIPTION OF THE INVENTION

For convenience, in the description which follows specific mention will be made to enhancing the extent of bioremediation of an oil contaminated soil. It should be readily appreciated, however, that the invention is not limited to enhancing the extent of bioremediation of oil contaminated soil treated with specific nutrients. Rather any hydrocarbon contaminated soil that has been subject to prior nutrient treatment, i.e. bioremediated soil, and whose rate of biodegradation has plateaued with time may be treated according to this invention.

As previously indicated, any bioremediated soil may be treated in accordance with the present invention; however, it is preferred to monitor the biodegradation performance of a freshly nutriated soil. When the biodegradation versus time profile of the freshly nutriated soil exhibits a plateau, indicating very little or substantially no additional biodegradation is occurring, the soil is then treated with a hydrocarbon solution containing a mixture of menthadienes and menthadiene alcohols and a surfactant selected from the group consisting of: (a) a mixture of monocarboxylic acid esters of sorbitan and polyoxyalkylene adducts of monocarboxylic acid esters of sorbitan, (b) alkyl glycosides and (c) mixtures of (a) and (b). In general, the carboxylic acids forming the esters of sorbitan will have from 7 to 22 carbon atoms. The polyoxyalkylene groups will range from 4 to 50 units per adduct and preferably will be selected from polyoxyethylene and polyoxypropylene groups. In the case of alkyl glycosides, the alkyl groups will have from about 8 to about 18 carbon atoms and the glycoside is a mono or diglucoside or a mixture thereof.

When the surfactant is a mixture of the above described sorbitan esters, they are combined to provide a HLB (Hydrophilic-Lipophilic Balance) in the range of from 4.5 to about 12.5.

It is preferred to dissolve the surfactants in a normal or branched aliphatic hydrocarbon having from about 6 to about 16 carbon atoms, although hydrocarbons such as tetralin, cycloalkanes, alkyl substituted aromatics may also be employed as a co-solvent. Importantly, the hydrocarbon solution will contain a mixture of a menthadienes and menthadiene alcohols. Menthadiene, of course, includes α-pinene, β-pinene and the like and menthadiene alcohol includes menthol and the like. The amount of menthadiene and menthadiene alcohols used will be in the range of about 5 to about 50 wt % based on the total weight of the formulation and preferably from about 10 to about 30 wt %.

Typically, the surfactant used will constitute from about 15 to about 75 weight percent of the total weight of solution.

In the practice of the invention, the hydrogen solution of the methadiene mixture and surfactant is applied to the soil typically by pouring, spraying, broadcasting and the like. Typically, the amount of solution applied to the soil will depend upon the amount of hydrocarbon contaminant in the soil. In general, however, the amount of solution to be applied, may range, for example, from about 1 percent by weight to about 30 percent by weight and preferably about 10 percent by weight based on the amount of hydrocarbon contaminate in the soil at the time of treatment.

After application of the solution to the soil, it is preferred to mix, at least the top surface of the soil, for example the top 6 to 24 inches, by any convenient means such as plowing, tilling, disking, roto-tilling and the like. In appropriate cases, however, the soil can be charged into a mechanical mixer and mixed with the solution therein. Thereafter microbial nutrients may be applied to the soil by any convenient means such as broadcasting pellets, powders, and the like and by spraying solutions of the nutrients; however, in the practice of the present invention it is preferred that microbial nutrients are applied by spraying an aqueous solution of the nutrients on the soil to be treated.

Typical microbial nutrients include urea, potassium nitrate, ammonium nitrate, and ammonium phosphate, sodium phosphate, and the like. In general, these nutrients are applied at a rate to provide a carbon to nitrogen to phosphorous ratio in the soil in the range of about 100:1:0.1 to about 100:10:5 and preferably 100:2:0.2.

After application of the microbial nutrients preferably they are then mixed with the soil, again by any convenient means such as plowing, tilling, disking, roto-tilling and the like.

In an alternate embodiment of the invention, the surfactants solution and nutrients can be applied to the soil concurrently or sequentially, followed by mixing. In a preferred embodiment of the invention the treated soil is periodically mixed and watered to maintain its water content, at least in the top 6 inches, in the range of from about 10 wt % to about 25 wt %.

To further illustrate the present invention, reference is made to the following example:

EXAMPLE 1

In the following example, hydrocarbon contaminated soil that was subjected to nutrient assisted bioremediation previously, and whose biodegradation versus time profile exhibited a plateau region where no appreciable degradation occurred, was used. A pan 12 inches long by 8 inches wide and 3 inches deep of the hydrocarbon contaminated soil was treated with a solution of a mixture sorbitans described in greater detail below. The mixture of surfactants constituted 50 wt % of the solution. The sorbitan carboxylic acid ester applied in the surfactant solution was a sorbitan mono-oleate sold under the trade name Span-80 by ICI Americas, Wilmington, Del. The polyoxyethylene sorbitan mono-ester employed was a polyoxyethylene (20) sorbitan mono-oleate sold under the trade name Tween-80, also by ICI Americas. The ratio of Span 80 to Tween-80 provided an HLB of 6.9.

The surfactants were dissolved in Norpar®-13 solvent and a mixture of menthadiene and menthadiene alcohols sold under the trade name RE-ENTRY-D solvent by Envirosolo, Inc., Jacksonville, Fla. The ratio of surfactants to Norpar®-13 to RE-ENTRY-D solvents is 1:0.5:0.5 by weight. Norpar®-13 is the trademark for a relatively narrow boiling range solvent sold by Exxon Company USA, Houston, Tex. Norpar®-13 contains greater than 98% by weight of normal paraffin.

The solution was applied to the soil at the rate of 10 wt % based on the weight of hydrocarbon contaminant in the soil. The surfactant solution was then mixed with the soil by hand-tilling. Next an aqueous solution of urea and ammonium dihydrogen phosphate having a C:N:P ratio of 100:2:0.2 was applied to the soil followed by hand-tilling. The pans were watered and hand-tilled weekly. The amount of water applied was sufficient to provide a moisture content of about 17 wt %.

After two-, four-, and six-week periods, the percent petroleum hydrocarbons biodegraded was determined for each of the examples using EPA method 418.1 with the following modifications:

1. The soil sample size was increased to 30 grams.
2. The acidification step specified in the test was eliminated.
3. The amount of drying agent required by the test was increased to assure effective drying.
4. The drying agent used was magnesium sulfate.
5. A four-hour time period for soxhlet extraction was employed.
6. The amount of silica gel used was increased.

Results of the tests are shown in the FIGURE. Also shown in the FIGURE are the results for a soil sample that was nutriated only once and not treated further.

What is claimed is:

1. In the method of bioremediating contaminated soil by the adding microbial nutrients to the soil whereby a bioremediated soil is obtained, the improvement comprising:

applying to the contaminated soil a solution consisting essentially of a mixture of menthadienes and menthadiene alcohols in an amount ranging from about 10 wt % to about 30 wt % based on the total weight of the composition in a normal or branched aliphatic hydrocarbon solvent of from about 6 to about 16 carbon atoms and a surfactant in an amount from about 15 to about 75 wt % of the total solution and selected from the group consisting of: (a) mixture of a sorbitan ester of a $C_7$ to $C_{22}$ monocarboxylic acid and a polyoxyalkylene adduct of a sorbitan ester of a $C_7$ to $C_{22}$ monocarboxylic acid, the adduct having 4 to 50 polyoxyalkylene units, (b) an alkyl glycoside wherein the alkyl group has from about 8 to about 18 carbon atoms and the glycoside is a mono or diglycoside, or mixtures thereof, and (c) a mixture of (a) and (b); thereafter applying microbial nutrients to the soil in amounts sufficient to promote the growth of indigenous microorganisms.

2. The improvement of claim 1 wherein the solution is applied at about 1 to 30 wt % of solution per weight of hydrocarbon contaminant in the soil.

3. The improvement of claim 1 including mixing at least the top surface of the soil after applying said solution.

4. A soil bioremediation method comprising:

applying microbial nutrients to hydrocarbon contaminated soil;

monitoring the extent of bioremediation over time to determine when the rate of biodegradation has plateaued;

and thereafter applying to the contaminated soil a solution consisting essentially of a mixture of menthadienes and menthadiene alcohols in an amount ranging from about 10 wt % to about 30 wt % based on the total weight of the composition in a normal or branched aliphatic hydrocarbon solvent of from about 6 to about 16 carbon atoms and a surfactant in an amount from about 15 to about 75 wt % of the total solution and selected from the group consisting of: (a) mixture of a sorbitan ester of a $C_7$ to $C_{22}$ monocarboxylic acid and a polyoxyalkylene adduct of a sorbitan ester of a $C_7$ to $C_{22}$ monocarboxylic acid, the adduct having 4 to 50 polyoxyalkylene units, (b) an alkyl glycoside wherein the alkyl group has from about 8 to about 18 carbon atoms and the glycoside is a mono or diglycoside, or mixtures thereof, and (c) a mixture of (a) and (b); thereafter applying microbial nutrients to the soil in amounts sufficient to promote the growth of indigenous microorganisms.

5. The method of claim 4 wherein the solution is applied at about 1 to 30 wt % of solution per weight of hydrocarbon contaminant in the soil and including mixing at least the top surface of the soil after applying said solution.

6. A composition consisting essentially of a mixture of menthadienes and menthadiene alcohols in an amount ranging from about 10 wt % to about 30 wt % based on the total weight of the composition in a normal or branched aliphatic hydrocarbon solvent of from about 6 to about 16 carbon atoms and a surfactant in an amount from about 15 to about 75 wt % of the total solution and selected from the group consisting of: (a) mixture of a sorbitan ester of a $C_7$ to $C_{22}$ monocarboxylic acid and a polyoxyalkylene adduct of a sorbitan ester of a $C_7$ to $C_{22}$ monocarboxylic acid, the adduct having 4 to 50 polyoxyalkylene units, (b) an alkyl glycoside wherein the alkyl group has from about 8 to about 18 carbon atoms and the glycoside is a mono or diglycoside, or mixtures thereof, and (c) a mixture of (a) and (b).

7. The composition of claim 6 wherein the weight ratio of surfactants to aliphatic hydrocarbon solvent to the mixture of menthadienes and menthadiene alcohols is 1:0.5:0.5.

* * * * *